No. 815,831. PATENTED MAR. 20, 1906.
A. W. HORNAUER.
APPARATUS FOR OBSERVING THE OSCILLATIONS OF LIGHT BEAMS.
APPLICATION FILED MAY 13, 1904.
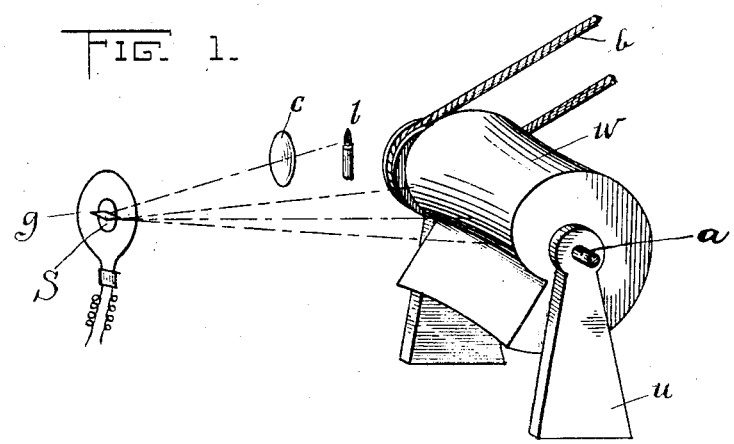
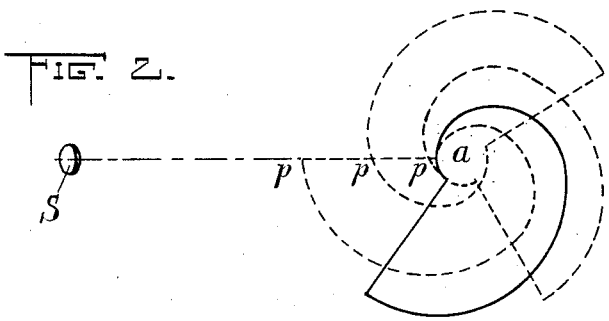
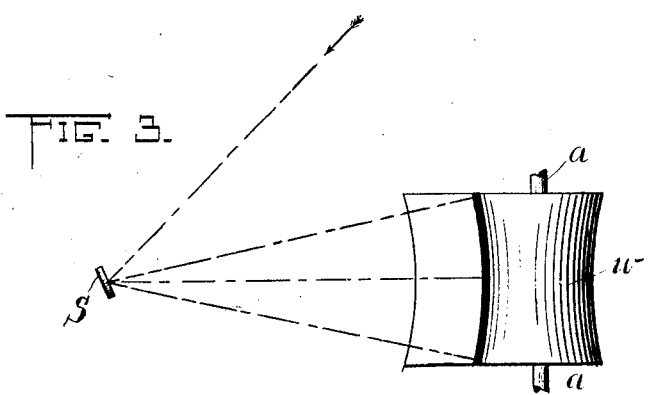
Andreas Wilhelm Hornauer,
Inventor
By his Attorneys Knight Bros
Witnesses

UNITED STATES PATENT OFFICE.

ANDREAS WILHELM HORNAUER, OF CHARLOTTENBURG, GERMANY.

APPARATUS FOR OBSERVING THE OSCILLATIONS OF LIGHT-BEAMS.

No. 815,831. Specification of Letters Patent. Patented March 20, 1906.

Application filed May 13, 1904. Serial No. 207,807.

*To all whom it may concern:*

Be it known that I, ANDREAS WILHELM HORNAUER, engineer, a subject of the King of Bavaria, residing at 15 Cauerstrasse, Charlottenburg, near Berlin, Germany, have invented a certain new and useful Improvement in Apparatus for Observing the Oscillations of Light-beams, of which the following is a full, clear, concise, and exact description.

This invention relates to an apparatus for observing the oscillations of light-beams, especially quick oscillations, which in consequence of their rapidity cannot be immediately followed up with the eye. Such oscillations may occur, for instance, in a beam of light from the reflecting-mirror of a measuring instrument, such as a galvanometer, in taking up the curves of current of electric-light circuits. Oscillations of the said character are usually recorded as functions of the time by employing movable surfaces to which is imparted a definite velocity at right angle to the plane of oscillation. For instance, a cylinder-surface has been proposed the axis of which is situated in the plane of oscillation of the light-beam and which is provided with sensitive paper to record the oscillations as functions of the time. Owing to their lasting effect, the oscillations of the light-beam are reproduced to the eye as straight lines on the cylinder-surface parallel to its axis. Sometimes it is desirable to render the periodic oscillations directly visible in order to avoid the troublesome photographic process and to make it possible to alter the oscillations while observing them. I attain these objects by the peculiar feature of the cylindrical body hereinafter described, and illustrated in the accompanying drawings, in which—

Figure 1 is a perspective view of the apparatus. Fig. 2 is a horizontal section of the cylindrical body at right angle to the axis thereof; Fig. 3, a top view of the same.

In the drawings, $w$ indicates the rotating roller; $l$, the source of light; $c$, a collector-lens; $s$, the oscillating mirror, which is provided for the oscillating system of the galvanometer $g$.

Let us suppose in this case that the apparatus serves for taking up the curves of electric-light currents. The roller $w$, which may be operated by a cord from an electric motor of known frequency, receives the light-ray from the mirror $s$, which is set in motion by the vibrations of the current to be examined with the apparatus. The small mirror of a measuring instrument reflects the light-beams that fall at a right angle upon the cylindrical body revolving round the axis $a$. The plane of oscillation of the light-beams ordinarily coincides with the axle of rotation $a$; but the relative positions may be varied according to circumstances. If the cylindrical body is at rest, the oscillating light will obviously make visible a luminous line on that portion of the cylindrical surface which is struck by the beam. Now the cross-section of the cylindrical body is not confined by a circle concentric to the axis, but has, say, a spiral form. In consequence thereof the lighting-point $p$, produced by the fixed light-beam on the rotating surface, will appear to the observer as moving to and fro at a right angle to the axis of rotation, as shown in Fig. 2, where the dotted lines indicate different positions of the cylindrical body. The law of this periodic motion of the point $p$ at right angle to the rotating axis obviously depends on the angular velocity and on the shape of cross-section of the said cylindrical body. If, for instance, the angular velocity is uniform and the sections of the cylindrical body are confined by Archimedean spirals, as shown in Fig. 2 of the drawings, the apparent motion of point $p$ will be to the left with a uniform velocity. If now both motions perpendicular to each other of the spot of light on the rotating surface take place at the same time, curves showing the interdependence of the two motions will appear to the observer. The curves are always visible if the figures confining the section of the cylindrical body are different from circles concentric with the axis. Assuming the simplest case where the duration of oscillation of the mirror coincides with the duration of revolution of the cylindrical body, a fixed curve will appear; otherwise the curves appear as moving to and fro on the rotating surface. By suitably choosing the given relations curves may be obtained which will be appropriate to the varying experimental conditions as far as their form and position is concerned. The cylindrical body will therefore not always have a purely cylindrical or developable surface. The form and area of the sections will, on the contrary, mostly be defined by another law.

What I claim as my invention, and desire to secure by Letters Patent, is—

In an apparatus for observing the oscillations of light-beams, the combination with an oscillatable mirror reflecting the beam, of a cylindrical body revolving at a right angle to the plane of oscillation, said body having cross-sections which are different from circles concentric with the axis of rotation, as and for the purpose set forth.

In witness whereof I hereunto subscribe my name this 25th day of April, A. D. 1904.

ANDREAS WILHELM HORNAUER.

Witnesses:
WOLDEMAR HAUPT,
HENRY HASPER.